No. 897,523. PATENTED SEPT. 1, 1908.
M. D. COOK.
TOY.
APPLICATION FILED OCT. 7, 1907.
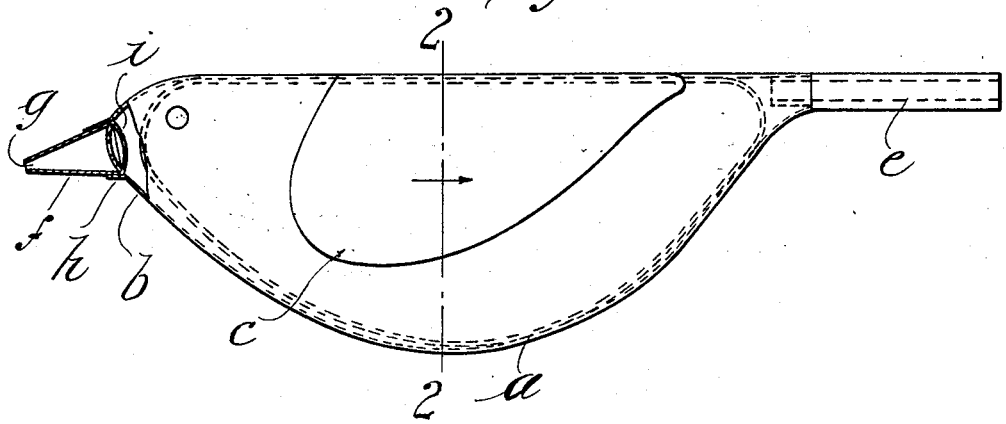
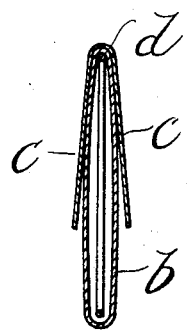 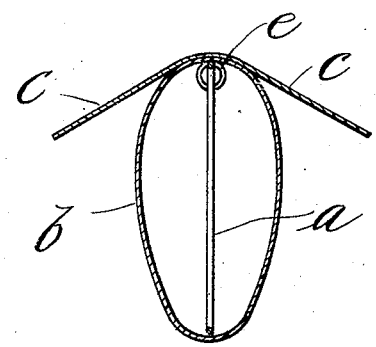
Witnesses:
H. L. Sprague
H. W. Bowen
Inventor,
Maud D. Cook.
by Chapin & Co.
Attorneys.

UNITED STATES PATENT OFFICE.

MAUD D. COOK, OF SPRINGFIELD, MASSACHUSETTS.

TOY.

No. 897,523.

Specification of Letters Patent.

Patented Sept. 1, 1908.

Application filed October 7, 1907. Serial No. 396,127.

*To all whom it may concern:*

Be it known that I, MAUD D. COOK, a citizen of the United States of America, residing at Springfield, in the county of Hampden and State of Massachusetts, have invented new and useful Improvements in Toys, of which the following is a specification.

My present invention relates to improvements in toys and has for its object to provide a simple and inexpensive amusement device or article of manufacture which may, if desired, be made to represent different kinds of birds or animals in its general outlines or form.
A further object of the invention is to construct the toy so as to imitate, as nearly as possible, the sound of some particular species of bird or animal, although the drawings only show the representation of a bird.
Further details of the construction of the toy or article of manufacture will be set forth in the specification and in the drawings forming a part thereof in which,—

Figure 1 is a side view of the toy, a portion of which is broken away to show the means for producing any particular sound or note when the same is used. Fig. 2 is a transverse sectional view on the line 2—2 of Fig. 1 in a collapsed condition, and Fig. 3 is a detail view in cross section of Fig. 1 showing the parts in an inflated condition.

In detail, $a$ designates the framework of the toy, preferably made of stiff wire bent into the form shown in dotted lines and representing a bird in its general outlines.

$b$ designates a covering for the framework $a$ which is constructed from some flexible and thin material, as paper, rubber, or oiled silk, the object being to use a material that will retain a suitable air-pressure and at the same time permit the ready expansion when inflated.

$c$ designates a piece of paper or other thin material that is secured to the top portion of the covering $b$ at its middle portion, as indicated at the point $d$. This piece is cut so as to represent the wings of a bird or toy.

In reference to Fig. 2, the body portion $b$ and the wing elements $c$ are shown in a flat or deflated condition, while in Fig. 3 these elements are shown expanded after the body part has been inflated by means of the tube $e$ that is pasted or otherwise secured to the body $a$ for affording the free passage of air to the interior when it is desired to inflate the toy.

$f$ designates the bill portion of the toy bird represented, preferably conical in form, and with an opening $g$ in the outer end thereof for permitting the confined air to escape from the body portion $a$. This part is secured to the body $a$ by pasting or otherwise, as shown at $h$. Secured to the base portion of the bill is a whistle or other device $i$ for producing any suitable sound when the toy is inflated, by reason of the escape of the air therethrough, although I do not limit myself to the use of a whistle as any analogous device may be substituted therefor, as a reed, for producing any given note or sound so as to imitate a particular species of bird or animal.

In using the toy, the operator inflates the body portion $b$ by blowing through the tube $e$, which operation causes the flexible sides to expand, as shown in Fig. 3; at the same time the wings are thrown outward representing more or less accurately the movements of the wings of a bird when in the act of flying. Simultaneously with the movement of the wings, the whistle $i$ is sounded. When the operator ceases to inflate the toy, the sides of the body $a$ collapse and the wing elements $c$ also fall downward close to the sides thereof.

What I claim is:—

1. As a new article of manufacture, a frame, an air-tight flexible covering enveloping the same, means for inflating the covering, means communicating with the interior of the covering for emitting a sound when the covering is inflated, and a part forming movable wing elements $c$ and secured at its middle portion to the exterior upper portion of the covering, whereby when the covering is inflated and deflated, the wing elements will rise and fall in unison with the movements of the covering, as described.

2. A toy, a frame element formed from a single piece of stiff material representing in outline a bird; an air-tight inflatable flexible covering therefor, movable wing elements to be actuated by the inflation thereof attached to the back portion of the covering, means for inflating the covering, and means for emitting a sound when the covering is inflated and the wings are moved.

3. A toy comprising a frame having in general the outline of a bird, an inflatable covering enveloping the same, means for inflating the covering, a bill element attached to the covering, means therein for emitting a sound when the cover is inflated, and movable wing portions attached to the upper edge of the covering and normally engaging the sides thereof, whereby when the covering is inflated and deflated the movable wing elements will rise and fall in unison therewith, and a sound will be emitted from the bill element, as described.

MAUD D. COOK.

Witnesses:
R. I. CLEMONS,
HARRY W. BOWEN.